(12) United States Patent
Young et al.

(10) Patent No.: US 12,086,887 B2
(45) Date of Patent: Sep. 10, 2024

(54) SYSTEM AND METHOD FOR OPERATIONAL WORKFLOW TRANSPARENCY AND END-TO-END EVENTS TRACKING

(71) Applicant: Elevance Health, Inc., Indianapolis, IN (US)

(72) Inventors: Jennifer Young, Cincinnati, OH (US); Lance Gothard, Harrisburg, NC (US); Ishaque Moodadi, Mason, OH (US); Anoop Premachandran, Loveland, OH (US); Sharon Goist, Alammogordo, NM (US); Jordan S. Firfer, Buffalo Grove, IL (US)

(73) Assignee: Elevance Health, Inc., Indianapolis, IN (US)

( * ) Notice: Subject to any disclaimer, the term of this patent is extended or adjusted under 35 U.S.C. 154(b) by 234 days.

(21) Appl. No.: 17/817,180

(22) Filed: Aug. 3, 2022

(65) Prior Publication Data
US 2023/0044404 A1   Feb. 9, 2023

Related U.S. Application Data

(60) Provisional application No. 63/228,889, filed on Aug. 3, 2021.

(51) Int. Cl.
*G06F 17/00* (2019.01)
*G06F 16/174* (2019.01)
(Continued)

(52) U.S. Cl.
CPC ......... *G06Q 40/08* (2013.01); *G06F 16/1748* (2019.01); *G06F 16/1805* (2019.01)

(58) Field of Classification Search
CPC .. G06Q 40/08; G06F 16/1748; G06F 16/1805
See application file for complete search history.

(56) References Cited

U.S. PATENT DOCUMENTS

| | | | |
|---|---|---|---|
| 8,402,002 B2 * | 3/2013 | Adam | G06Q 10/06 707/688 |
| 8,463,770 B1 * | 6/2013 | Thirumalai | G06F 16/9535 707/722 |

(Continued)

OTHER PUBLICATIONS

Christian Tschudin. 2019. A Broadcast-Only Communication Model Based on Replicated Append-Only Logs. SIGCOMM Comput. Commun. Rev. 49, 2 (Apr. 2019), 37-43. <https://doi.org/10.1145/3336937.3336943> (Year: 2019).*

*Primary Examiner* — Greta L Robinson
(74) *Attorney, Agent, or Firm* — Morgan, Lewis & Bockius LLP (57) ABSTRACT

A method for operational workflow transparency and end-to-end events tracking, the method includes at an event producer system, generating events, corresponding key business attributes, provider industry standard identifiers, patient identifiers, and patient information, and publishing the events and the key business attributes to a tracking system. At a tracking system, receiving and validating the events from the event producer system, generating a universally unique lexicographically sortable identifier (ULID) for an append-only log data structure for the respective event, generating a search index to enable search capabilities for the append-only log data structure, and temporally appending the respective event into the append-only log data structure for the corresponding prior-authorization case.

18 Claims, 6 Drawing Sheets

(51) Int. Cl.
*G06F 16/18*     (2019.01)
*G06Q 40/08*    (2012.01)

(56) References Cited

U.S. PATENT DOCUMENTS

| | | |
|---|---|---|
| 10,423,759 B1 | 9/2019 | Harris, Sr. |
| 10,983,843 B2 | 4/2021 | Duggal et al. |
| 2015/0378775 A1* | 12/2015 | Vermeulen .............. G06F 16/28 707/703 |
| 2016/0344834 A1* | 11/2016 | Das .................... H04L 67/1097 |
| 2017/0116210 A1* | 4/2017 | Park ................... G06F 16/2433 |
| 2020/0250172 A1 | 8/2020 | Busjaeger et al. |
| 2021/0073736 A1* | 3/2021 | Alawi .............. G06Q 10/06315 |

\* cited by examiner

SYSTEM AND METHOD FOR OPERATIONAL WORKFLOW TRANSPARENCY AND END-TO-END EVENTS TRACKING

CROSS-REFERENCE TO RELATED APPLICATIONS

This application claims the benefit of U.S. Provisional Patent Application No. 63/228,889 filed Aug. 3, 2021 entitled "System and Method for Operational Workflow Transparency and End-To-End Events", which is incorporated by reference herein in its entirety.

TECHNICAL FIELD

The present application relates to the field of operational transparency and the tracing and tracking of business events and business workflows.

BACKGROUND

Most medical services and prescriptions can be performed or filled immediately upon approval from a doctor. However, some procedures/drugs need insurance provider review and approval before they are covered. This process, called prior authorization, helps ensure that procedures/drugs are performed/used as recommended.

Prior authorizations are reviewed by an independent review committee. The independent review committee includes a large group of independent doctors and pharmacists. This group and other professionals are responsible for the decisions surrounding procedures/drugs. Prior-authorization requirements are developed as a result of these findings.

Implementing such a unified workflow can be difficult, especially if for enterprise organizations formed by a combination of disparate organizations, each with different prior-authorization workflows implemented in different software systems. The healthcare revenue cycle value chain (a process of identifying, collecting, and managing the provider's revenue from payers and patients based on the services provided) is supported by large numbers of disparate, heterogeneous, and disjointed software solutions and instrumentation. This results in significant inefficiencies, higher costs, and lack of control over the information residing in these many systems. Solving the problems associated with prior authorizations is a critical success factor in improving patient outcomes and reducing healthcare costs. Systems supporting prior authorizations monitor the status of the prior authorization, within the system boundary, until a final determination is reached. However, rarely is there only one system responsible for all prior-authorization activities from end to end. Delegated vendors are used to assist with the utilization management for specialized prior-authorization requests, such as radiology and diagnostic services. A patient may also exercise his or her right to appeal if the reason for a prior-authorization denial is in question.

SUMMARY

A system of one or more computers can be configured to perform particular operations or actions by virtue of having software, firmware, hardware, or a combination of them installed on the system that in operation causes the system to perform the actions. One or more computer programs can be configured to perform particular operations or actions by virtue of including instructions that, when executed by data-processing apparatus, cause the apparatus to perform the actions. One general aspect includes a method for operational workflow transparency and end-to-end events tracking. The method also includes at an event producer system: generating one or more events and corresponding key business attributes, where the one or more events are individual occurrences related to a user workflow, where the key business attributes include system generated identifiers, provider industry standard identifiers, patient identifiers, and patient information; publishing the event and the key business attributes to a tracking system via one or more internet protocols and application platform interfaces provided by the tracking system. The method also includes at a tracking system: receiving one or more events from an event producer system; for each respective event of the one or more events: validating the respective event; generating a universally unique lexicographically sortable identifier (ULID) for an append-only log data structure for the respective event, where each row in the log data structure corresponds to a unique prior-authorization case with a unique business case identified, where each unique prior-authorization case includes one or more temporally linked events associated with the respective prior-authorization case; generating a search index to enable search capabilities for the append-only log data structure, where the search index includes search attributes including name, account identifier and a data pointer to a corresponding prior-authorization case in the log data structure; and temporally appending the respective event into the append-only log data structure for the corresponding prior-authorization case. Other embodiments of this aspect include corresponding computer systems, apparatus, and computer programs recorded on one or more computer storage devices, each configured to perform the actions of the methods.

Implementations may include one or more of the following features: the method where validating the respective event includes identifying the originating context of an event, identifying the temporal order of the events relative to the originating context, understanding business information carried in the event, and correlating event instances from multiple event producers to be sent to the same data stream. Validating the event further may include tokenizing confidential information. An application platform interface (API) allows users to query, group, and page through statuses and status history of an event while selecting only the data necessary to support various channels. The APIAPI uses the search index to obtain the unique identifiers, then accesses the append-only log data structure directly and aggregates the events in real time based on a user's query. The event producer system updates preauthorization status information, when received or pended, based on information supplied by a utilization management and appeal system. A unique business case identified is used as a correlation key linked to a log data structure ensuring that only the events related to a particular prior authorization are grouped together sequentially. An extended workflow event will be appended to a preauthorization end-to-end log when an event is received with the correlation key. Appending to the log correlates events creating a representation of a preauthorization workflow. The event producer system is deployed on-premises or in a public, private, hybrid, or cloud-based system. The method may include collecting metrics, counts, or additional groupings for reporting. The request includes event characteristics and query characteristics for querying requisite data from the event; in response to receiving the request from a user: accessing a search index database using the event characteristics, where the search index database includes unique pointers to event entries in an append-only log data structure, where each event entry includes one or more temporally sequentially linked sub-events; obtaining a respective unique data pointer to a respective event entry in the append-only log data structure; traversing the append-only log data structure using the respective unique data pointer obtained from the search index database; obtaining the temporally sequentially linked sub-events that correspond to the event entry associated with the respective unique data pointer obtained from the search index database; removing any temporally sequentially linked sub-events that are duplicates of other temporally sequentially linked sub-events or are not responsive to the request from the user; organizing temporally sequentially linked sub-events from the append-only log data structure and constructing a data graph based on the query characteristics; traversing the temporally sequentially linked sub-events of the data graph based on the query characteristics to select results data; and returning the results data to the client device. Implementations of the described techniques may include hardware, a method or process, or computer software on a computer-accessible medium.

One general aspect includes a method for receiving a search query in an end-to-end event status tracking system. The method also includes receiving a request from a client device for tracking status in the end-to-end event tracking system, where the request includes event characteristics and query characteristics for querying requisite data from the event. The method also includes in response to receiving the request from a user: accessing a search index database using the event characteristics, where the search index database includes unique pointers to event entries in an append-only log data structure, where each event entry includes one or more temporally sequentially linked sub-events; obtaining a respective unique data pointer to a respective event entry in the append-only log data structure; traversing the append-only log data structure using the respective unique data pointer obtained from the search index database; obtaining the temporally sequentially linked sub-events that correspond to the event entry associated with the respective unique data pointer obtained from the search index database; removing any temporally sequentially linked sub-events that are duplicates of other temporally sequentially linked sub-events or are not responsive to the request from the user; organizing temporally sequentially linked sub-events from the append-only log data structure and constructing a data graph based on the query characteristics; traversing the temporally sequentially linked sub-events of the data graph based on the query characteristics to select results data; and returning the results data to the client device. Other embodiments of this aspect include corresponding computer systems, apparatus, and computer programs recorded on one or more computer storage devices, each configured to perform the actions of the methods.

Implementations may include one or more of the following features: the method where the query characteristics include filtering, grouping, and sorting options. The data graph includes vertices that correspond to sub-events and edges that include timestamps indicated when a respective sub-event occurred. The data graph is a directed acyclic graph. Business keys within the append-only log data structure are used to access third-party databases to obtain additional data. The method may include determining whether the results data satisfies the request from the client device; if the results data does not satisfy the request from the client device, obtaining business keys from append-only log data structure and obtaining additional data from third-party databases to append to the results data; if the results data does satisfy the request from the client device, refraining from obtaining the business keys and providing the results data to the user. Implementations of the described techniques may include hardware, a method or process, or computer software on a computer-accessible medium.

BRIEF DESCRIPTION OF THE DRAWINGS

The foregoing summary, as well as the following detailed description of embodiments of the invention, will be better understood when read in conjunction with the appended drawings of an exemplary embodiment. It should be understood, however, that the invention is not limited to the precise arrangements and instrumentalities shown.

DETAILED DESCRIPTION

Reference will now be made in detail to implementations, examples of which are illustrated in the accompanying drawings. In the following detailed description, numerous specific details are set forth in order to provide a thorough understanding of the various described implementations. However, it will be apparent to one of ordinary skill in the art that the various described implementations may be practiced without these specific details. In other instances, well-known methods, procedures, components, circuits, and networks have not been described in detail so as not to unnecessarily obscure aspects of the implementations.

In some embodiments, the primary method currently employed by healthcare companies to solve end-to-end status tracking is to migrate disparate systems to a single source of truth. These migration efforts require a significant amount of time and cost, which are compounded by mergers, acquisitions, and partnerships within the healthcare ecosystem.

System boundary fragmentation within the prior-authorization end-to-end workflow and resulting from mergers, acquisitions, and partnerships within the healthcare ecosystem is a result of many components within a single organization, multiple components across an organization, external components via vendors, and/or extended workflow components that correlate to an existing prior authorization. Users must keep a mental model of the end-to-end workflow while navigating various screens and/or logging into multiple systems to understand the status of the prior authorization. Systems represent the same basic idea, but with varying terminology, codes, and visualizations, resulting in an attention tax and decreased productivity due to context switching.

Within a system boundary, status changes may be classified as transient and not persisted; therefore, they are not retrievable. The current status may be retrievable, but previous status changes are logged as part of an audit process and may not be exposed. Replicating data, via a data warehouse function, and trying to reconstitute the status changes leads to data loss, as replication is a point in time and not consistently implemented across system boundaries. Challenges in standardizing status tracking become exponential as the number of system boundaries increases.
One Internal System Boundary Various software solutions provide capabilities to track and/or trace. To track a prior authorization, the software solution must receive the authorization from a provider, and an authorization identifier must be assigned. Using the authorization identifier, a user (provider, patient, member, or agent) can check within the software solution to determine the status and expected turnaround time for the authorization to be completed.
Multiple Internal System Boundaries If the prior-authorization workflow spans multiple software solutions, various identifiers and related information must be replicated to all systems to provide the linkage of data objects relevant to the end-to-end prior-authorization workflow. Status tracking is coupled with other features within a system, resulting in additional scope (data and modifications) to ensure that other aspects of the target system function as expected and the original purpose of the target system is not compromised simply to provide status tracking. This coupling results in a migration effort that increases the time and cost of implementing status tracking. Not all software solutions within the revenue cycle value chain can be modified and/or manage the ongoing maintenance of importing and linking of data objects, resulting in gaps when reporting status and history and calculating expected turnaround time.
External Systems Vendors that specialize in complex authorizations simply send the outcome of the authorization. Incremental authorization statuses are not sent. The inability to communicate the status of the authorization limits the consistent reporting of status changes to a user (provider, patient, member, or agent) when complex authorizations are being provided. History and the calculation of expected turnaround time are not possible, resulting in an experience degradation to a user based on the scenario being reported.
Extended Workflows (Appeals)

Additional workflows, such as appeals, are maintained within a separate system boundary. A patient can appeal a denied authorization resulting in a new workflow to be tracked and/or traced that correlates to the prior authorization. A new identifier is assigned for the appeal requiring entry of supporting identifiers to link data objects across systems. This linkage can occur after status changes, so a status must be retroactively linked. Although logically an appeal is part of the prior-authorization business workflow, the technical implementation creates a separation that requires users to look up separately.

In some embodiments, the invention is a utilization-management tracking system that provides transparency to a user to view status changes of prior authorization and subsequent workflows (appeal). The system supports decision-making across the value chain by providing a single centrally managed data graph. The data graph's implementation is federated, enabling new features to be implemented independently of the utilization-management tracking and tracing system boundary. In some embodiments, the system objective is to provide a lightweight, cost-effective solution to tracking the life cycle of a prior authorization that works internally and with external partners.

In some embodiments, the invention provides a user with information about the status of prior authorization and enables that user to obtain detailed information without storing the details in a central repository. The system updates the authorization status information, i.e., when received, pended, and so forth, based on information supplied by the utilization-management and appeal systems. Authorization status changes are then utilized in various channels, such as web, mobile, notifications, etc., to provide users with real-time status information and history.

Figure 1:
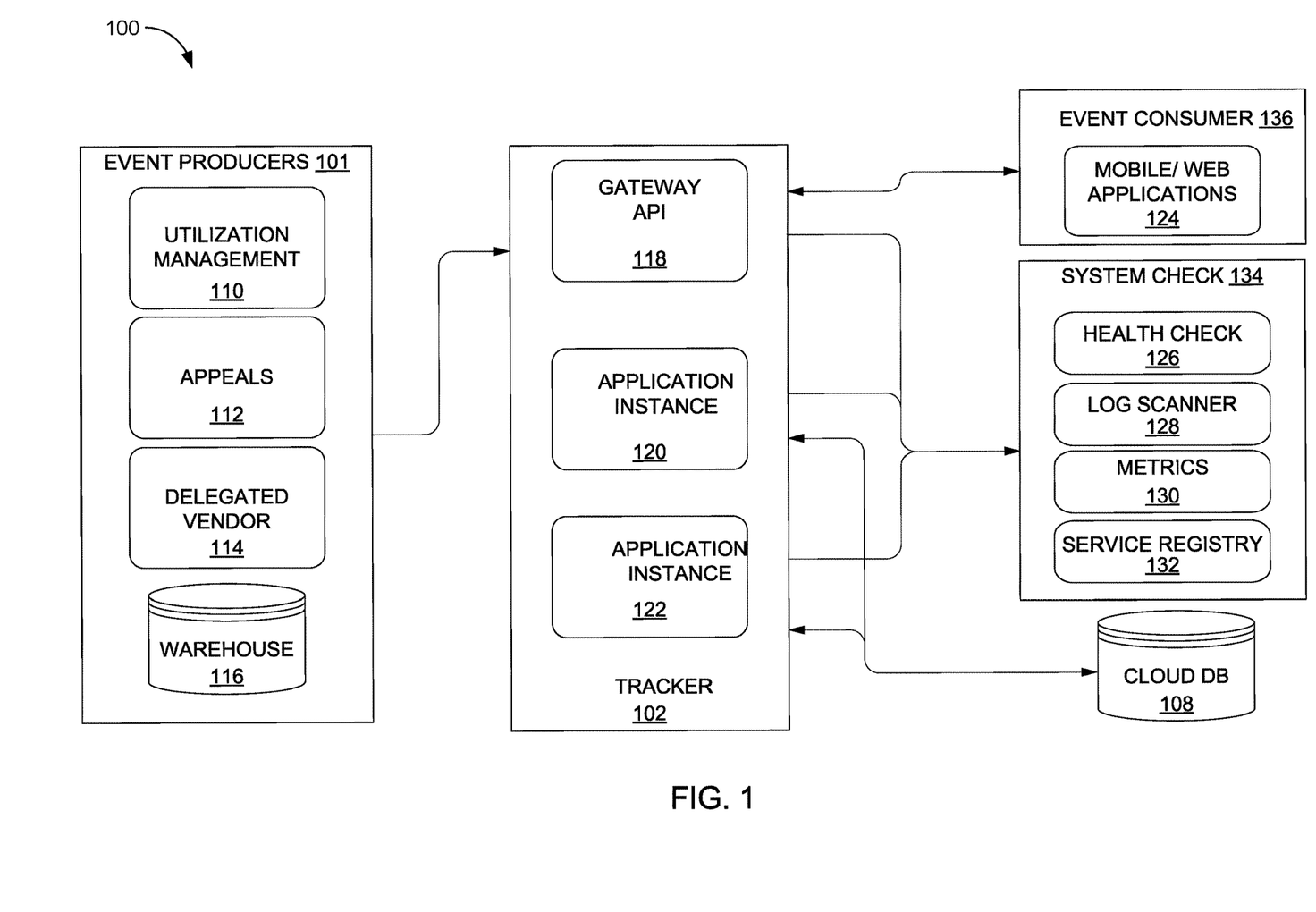
FIG. 1 illustrates a system diagram for end-to-end pre-authorization tracking, in accordance with some embodiments.

FIG. 1 illustrates a system diagram for end-to-end preauthorization tracking, in accordance with some embodiments. The system 100 may include event producer device 101, tracker device 102, event consumer device 136, system check 134 and cloud database 108.

Event producer device 101 represents one or more systems that produce information about the status of a user-specific workflow (e.g., prior authorization). Each data instance of information produced by an event producer may be defined as an event (or also referred to herein as a sub-event). The system 100 provides a producer of an event with the means to deliver that event through various industry-standard protocols (e.g., HTTP) and open-source protocols (e.g., GraphQL). A producer can be one or more systems participating in the preauthorization life cycle. Care-management solutions support the review and authorization of cases that require preauthorization. External vendors that specialize in complex authorizations are used to assist with the utilization management for specialized prior-authorization requests such as radiology and diagnostic services. After the preauthorization decision, patients can exercise their right to appeal if the reason for a preauthorization denial is in question.

Event producer device 101 may include utilization management module 110, appeals module 112, delegated vendors module 114, and warehouse module 116. Utilization management module 110 may be configured to provide information regarding utilization-management events to tracker 102. Utilization management is the evaluation of the medical necessity, appropriateness, and efficiency of the use of healthcare services, procedures, and facilities under the provisions of the applicable health benefits plan, sometimes called "utilization review." Appeals module 112 may be configured to provide information regarding prior-authorization appeals to tracker 102. Appeals module 112 may include a patient petition for a denied authorization resulting in a new workflow to be tracked and/or traced that correlates to the preauthorization. A new identifier (separate from utilization-management identifiers) is assigned for the appeal event in the appeals module 112 requiring entry of supporting identifiers to link data objects across systems. This linkage can occur after status changes, so a status must be retroactively linked. For example, events coming from extended workflows (e.g., appeals) may not have the correlation key initially. Extended workflows are placed into a separate append-only log data structure based on the business key for that workflow. Once an event is received with the correlation key, the extended workflow log will be appended to the prior-authorization end-to-end log. Although logically an appeal event in the appeals module 112 is part of the preauthorization business workflow, the technical implementation creates a separation that requires users to look up or search separately. Delegated vendor module 114 may be configured to conduct the medical necessity review for an advanced medical request (e.g., radiology, imaging) submitted by a physician and may include various companies that specialize in imaging associated with prior-authorization scenarios. Examples of imaging include Advanced Imaging include CT, MRI, MRA, PET, quantitative CT, and arterial ultrasound for Abdominal and pelvic imaging, Brain imaging, Chest imaging, Extremity imaging, Head and neck imaging, Oncologic imaging, Spine imaging and Vascular imaging. Warehouse module 116 may be configured to send historical data to recreate historical events and may include snapshots of prior authorization and appeal data loaded to the warehouse.

The tracker device 102 may be configured to receive event information from the event producer devices 101 while simultaneously responding to requests for event information from the event consumer devices 136.

The tracker device 102 may be a server device. A server device may be any computing device, including one or more software modules (e.g., a scoring module) for receiving and/or responding to requests for data from a client device. Examples of data may include web page data, hypertext markup language (HTML), text, video, audio as a free-form speech describing symptoms and conditions, picture, software, and executable, interpretable, byte-code, and binary files. In some aspects, the server device may be a plurality of computing devices that process the request from the client device. The server device may be configured to process requests from other computing devices in parallel with the request from the client device.

In one aspect, a server device is a web server that hosts a website. Client devices that interact with server devices may be configured to request provider recommendations from server devices based on a hypertext transfer protocol (HTTP). A server device may respond to a provider recommendation request by sending provider recommendation data (e.g., an ordered list of providers) to a client device. In one aspect, provider recommendation data may include web page data included on an HTML web page. While the server device may be configured for HTTP/HTML requests and responses, as described in the exemplary aspect above, the system 100 is not limited to the use of HTML or HTTP, and that aspect of the present invention can be used with any computer communication language or network protocol suitable for the purposes of the described communications between a client device and a server device.

Tracker device 102 may be a command query separation (CQS) based system. In a CQS system, a call to the system should either be a command that performs an action, or a query that returns data to the caller, but not both. CQS is particularly well suited to a design by contract (DbC) methodology, in which the design of a program is expressed as assertions embedded in the source code, describing the state of the program at certain critical times. In DbC, assertions are considered design annotations—not program logic—and, as such, their execution should not affect the program state. CQS is beneficial to DbC because any value-returning method (any query) can be called by any assertion without fear of modifying program state. In theoretical terms, this establishes a measure of sanity whereby one can reason about a program's state without simultaneously modifying that state. In practical terms, CQS allows all assertion checks to be bypassed in a working system to improve its performance without inadvertently modifying its behavior. CQS may also prevent the occurrence of certain kinds of heisenbugs. Even beyond the connection with design by contract, CQS is considered by its adherents to have a simplifying effect on a program, making its states (via queries) and state changes (via commands) more comprehensible.

CQS may be well suited to the object-oriented methodology, but it can also be applied outside of object-oriented programming. Since the separation of side effects and return values is not inherently object-oriented, CQS can be profitably applied to any programming paradigm that requires reasoning about side effects Tracker device 102 may include gateway API module 118, application instance module 120 and application instance module 122. The gateway API module 118 may be configured to provide an application platform interface to send and receive data between event producer devices 101 and event consumer devices 136. Gateway API 118 may be a federated API that ensures that the events stay lightweight in a common schema for faster processing, as only the business keys are stored in the event store. Event producer devices 101 may invoke the gateway API 118 in tracker device 102 to send events to the tracker device 102. The gateway API 118 may convert event data into a common schema for storage in cloud database 108. Application instances 120 and 122 may be configured as a collection of services and service groups that are associated with a particular user. Event consumer devices 136 may be configured to interact with application instances 120 and 122 at the tracker device 102 to query event information from tracker device 102.

Application instances 120 and 122 hosted by tracker device 102 may be deployed on on-premises, public, private, hybrid or cloud formats. This includes the operating system software, virtual machines, application server software, network security software, web access management software, database driver software, and third-party libraries.

The system check 134 includes health check module 126, log scanner module 128, metrics module 130, and service registry module 132. The system check module 134 may be configured to help ensure that events are not lost. Health check module 126 may be configured to determine health of the system using an HTTP endpoint. With this endpoint, the API, can be probed for its health and hence determine its readiness and liveness. Log scanner module 128 may be configured to observe the system giving invaluable insight into the health and operations of the application. Metrics module 130 may be configured to measure the performance, diagnose errors, and to write trace information. Service registry module 132 may be configured to discover and access services that provide additional information.

Event consumer module 136 may be a client device that utilizes mobile or web applications 124 to access functions and services offered by tracker device 102. A client device may be a computing device for receiving inputs from a user (e.g., a member), requesting data from a server device via a network and/or displaying data from a service device at the request of a user. Examples of a client device may include a smartphone, tablet or personal computer, among others. A client device (e.g., web, mobile) may access the infrastructure and application resources that are managed by load-balancing incoming requests from client devices and routing those requests to the application servers. The client request is then authenticated by the gateway API 118 routed to the application server cluster. The application then writes to the append-only log and builds the search index in the database.

Figure 3:
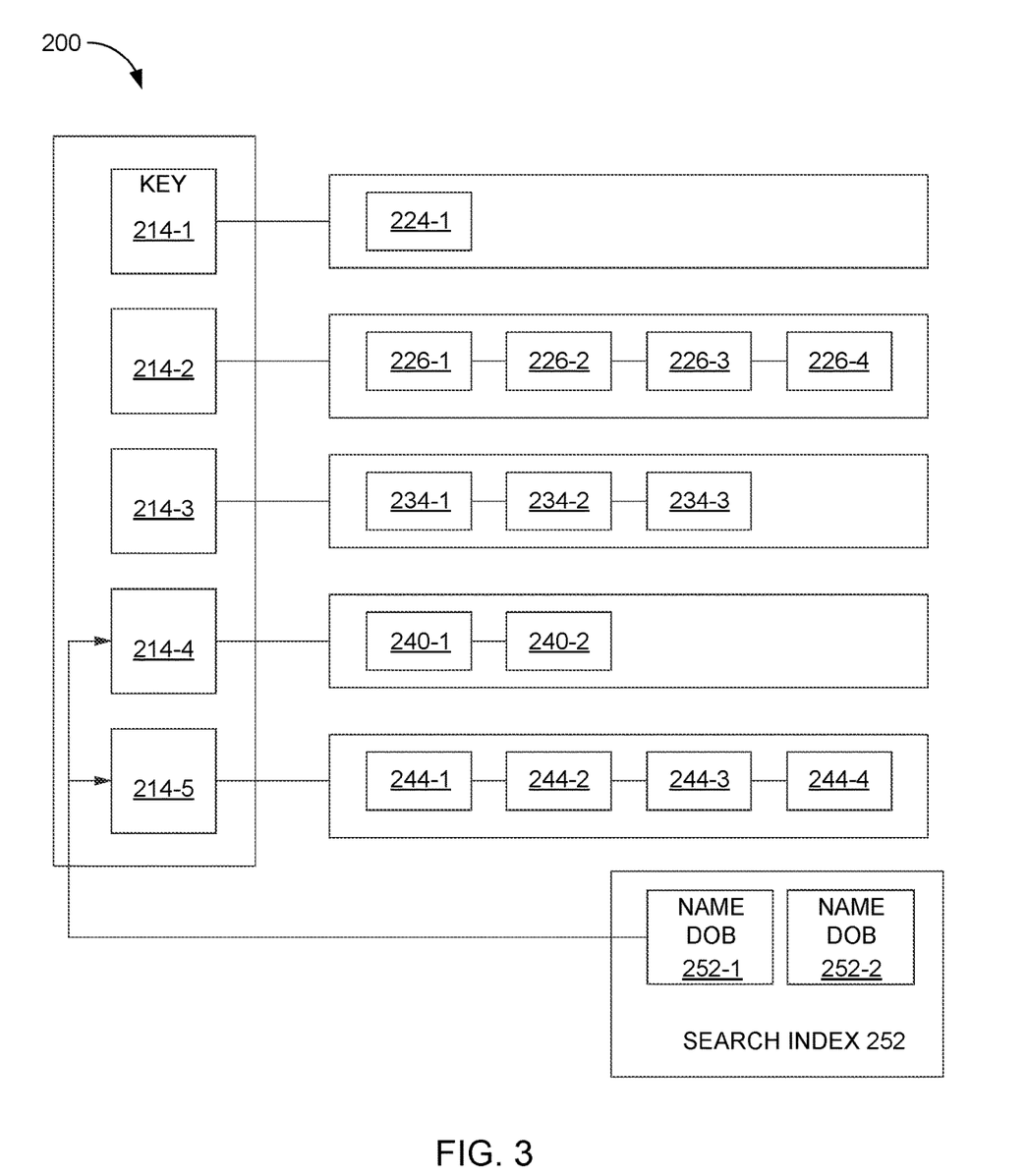
FIG. 3 illustrates an exemplary database structure used by the system of FIG. 1, in accordance with some embodiments.

When a client device accesses the gateway API 118, the tracker device 102 reconstructs the current state of the user workflow or event log by replaying the events in the event log and formulating the events into a format suitable to the client device. In some instances, the tracker device 102 may utilize application instances 120 and 122 to retrieve data stored in database 108 by event producers. Database 108 may include an append-only log and a search index. Examples of the database structure are shown in FIG. 3.

Configuration details regarding cloud database module 108 and its event log data structure are described in more detail below.

Additional information is accessible via external services, which provide more details to the events logged.

A state machine representing the event pattern for a prior-authorization end-to-end workflow is used to reconstitute the events into an API representing status changes. The API (e.g., GraphQL) allows users to query, group, and page through statuses and status history, selecting only the data necessary to support various channels (e.g., web, mobile, notifications) and screens. The API uses the search index to obtain the unique identifiers, then accesses the append-only log data structure directly and aggregates the events in real time based on the users' query.

Events in the append-only log contain business keys used to link to business entities residing in another system within the enterprise. Systems outside of the system boundary can register their API (e.g., Federated GraphQL) via a gateway. The gateway will merge the API schemas into a single schema that can be consumed by the user, enabling drill-down capability on each event for additional information about each event. Separation of concerns at an enterprise level is achieved by allowing areas with subject-matter expertise to participate in the system boundary rather than replicating and creating an additional boundary with the enterprise. This reduces duplication and allows a singularity of purpose rendering the overall system easier to maintain.

To that end, in at least one aspect, the system 100 may include one or more computers or servers, nontransitory memory operable to store one or more computer programs, and one or more processors to implement the one or more computer programs. For example, the system 100, shown in FIG. 1, may include a client device (e.g., mobile/web applications 124), server device and network.

A client device may include a communication infrastructure, processor, memory, user interface and communication interface. A server device may include a communication infrastructure, processor, memory and communication interface.

The processor may be any type of processor, including but not limited to a special-purpose digital signal processor. The processor is connected to a communication infrastructure (for example, a bus or network). Various software implementations are described in terms of this exemplary computer system.

Memory may include one or more of random access memory (RAM), a hard disk drive and a removable storage drive, such as a floppy disk drive, a magnetic tape drive, or an optical disk drive. The removable storage drive may read from and/or write to a removable storage unit. The removable storage unit can be a floppy disk, a magnetic tape, an optical disk, etc., which is read by and written to a removable storage drive. Memory may include a computer usable storage medium having stored therein computer software programs and/or data to perform any of the computing functions of the client device and/or server. Computer software programs (also called computer control logic), when executed, enable the client device and/or server to implement aspects of the present invention as discussed herein. Accordingly, such computer software programs represent controllers of the client device and/or server. Memory may include one or more data stores that store data such as web page data, software files or any other types of data files. The server device may retrieve the data from the memory before transmitting to the client device via the network. The memory may include member characteristics, provider characteristics, member-provider interaction characteristics, feature bias weightings, member/provider bias weightings, and learnt weightings, among others described herein.

User interface may be produced by a program that controls a display (not shown) of a client device. User interface may include one or more peripheral user interface components such as a keyboard or a mouse. The user may use the peripheral user interface components to interact with a client device. User interface may receive user inputs, such as mouse inputs or keyboard inputs, from the mouse or keyboard user interface components. User interface may display data, such as web pages, on the display of a client device using a web browser. While the user interface may be configured for displaying data using a web browser, as described in the exemplary aspect above, user interface is not limited to displaying data using a web browser, and aspects of the present invention may contemplate using other display devices or software suitable for the purposes of displaying the data.

Communication interface allows data to be transferred between a client device and a server device via a network. Examples of communication interface may include a modem, a network interface (such as an Ethernet card), a communication port, a Personal Computer Memory Card International Association (PCMCIA) slot and card, etc. Data transferred via communication interface are in the form of signals, which may be electronic, electromagnetic, optical, or other signals capable of being transmitted or received by communication interface.

A network connects a client device and a server device by carrying signals. A network may be implemented using wire or cable, fiber optics, a phone line, a wireless link, a cellular phone link, a radio frequency link, or any other suitable communication channel. For instance, a network may be implemented using a combination of channels. A network may be implemented as an intranet and/or an internet.

Figure 2A:
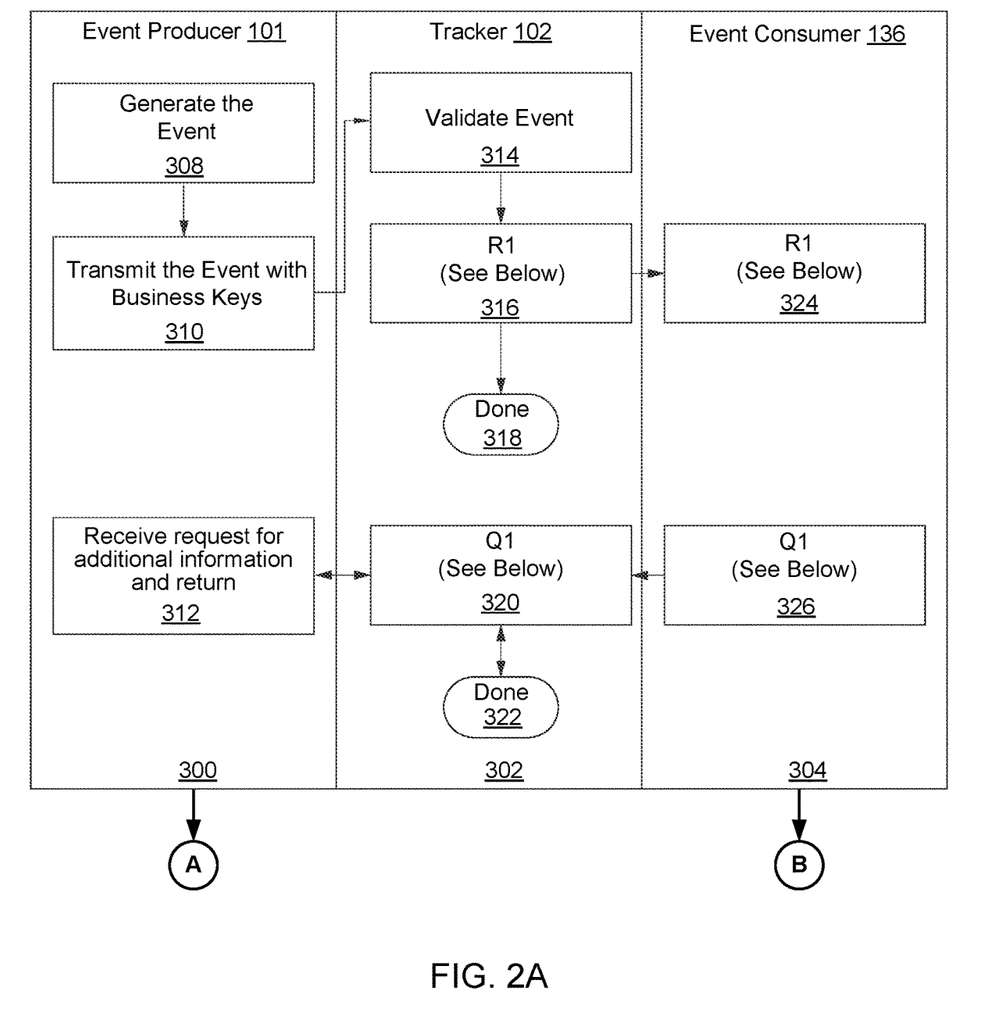
FIGS. 2A-2C illustrate producer and consumer workflows in accordance with some embodiments.
Figure 2B:
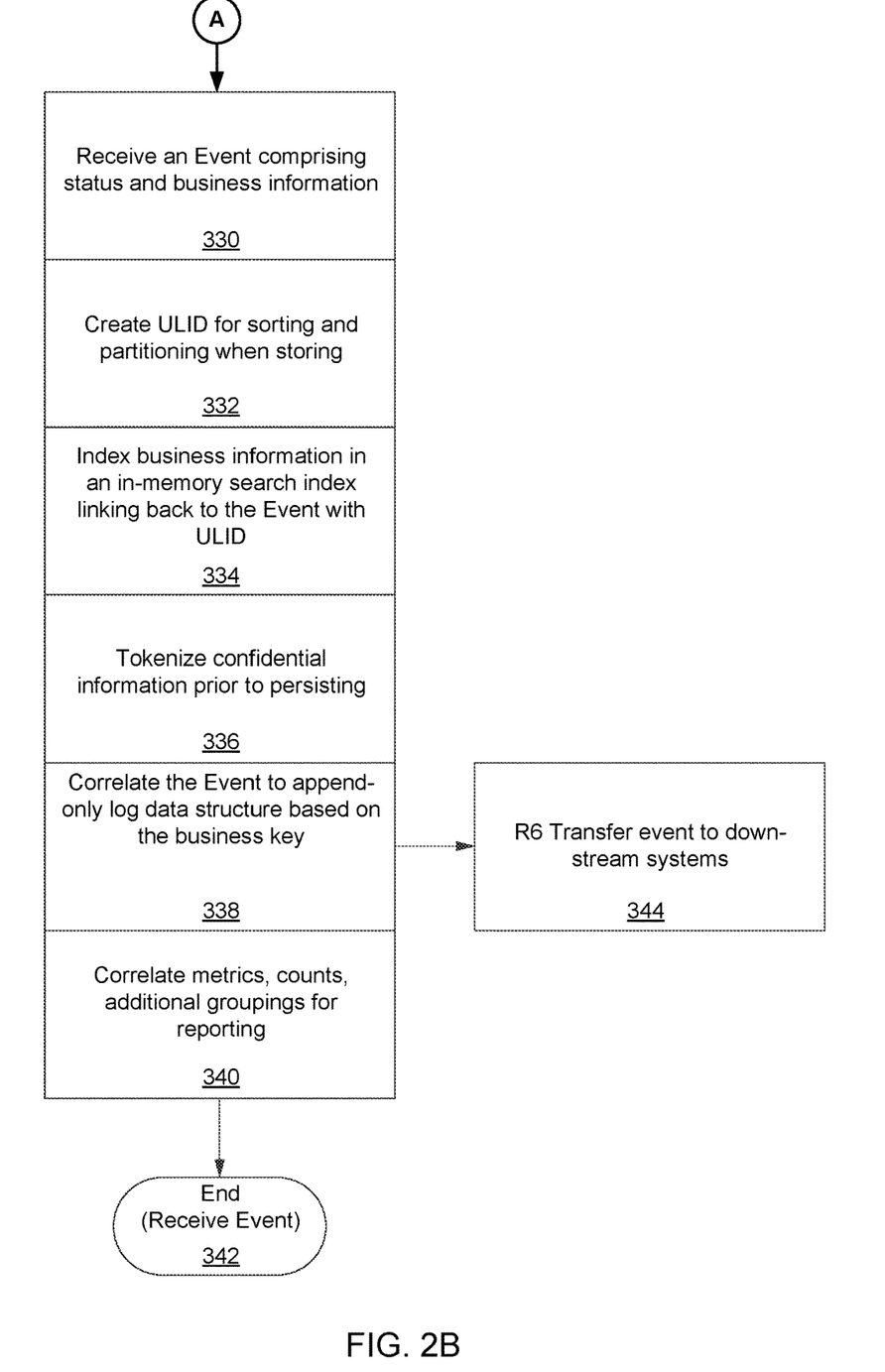
Figure 2C:
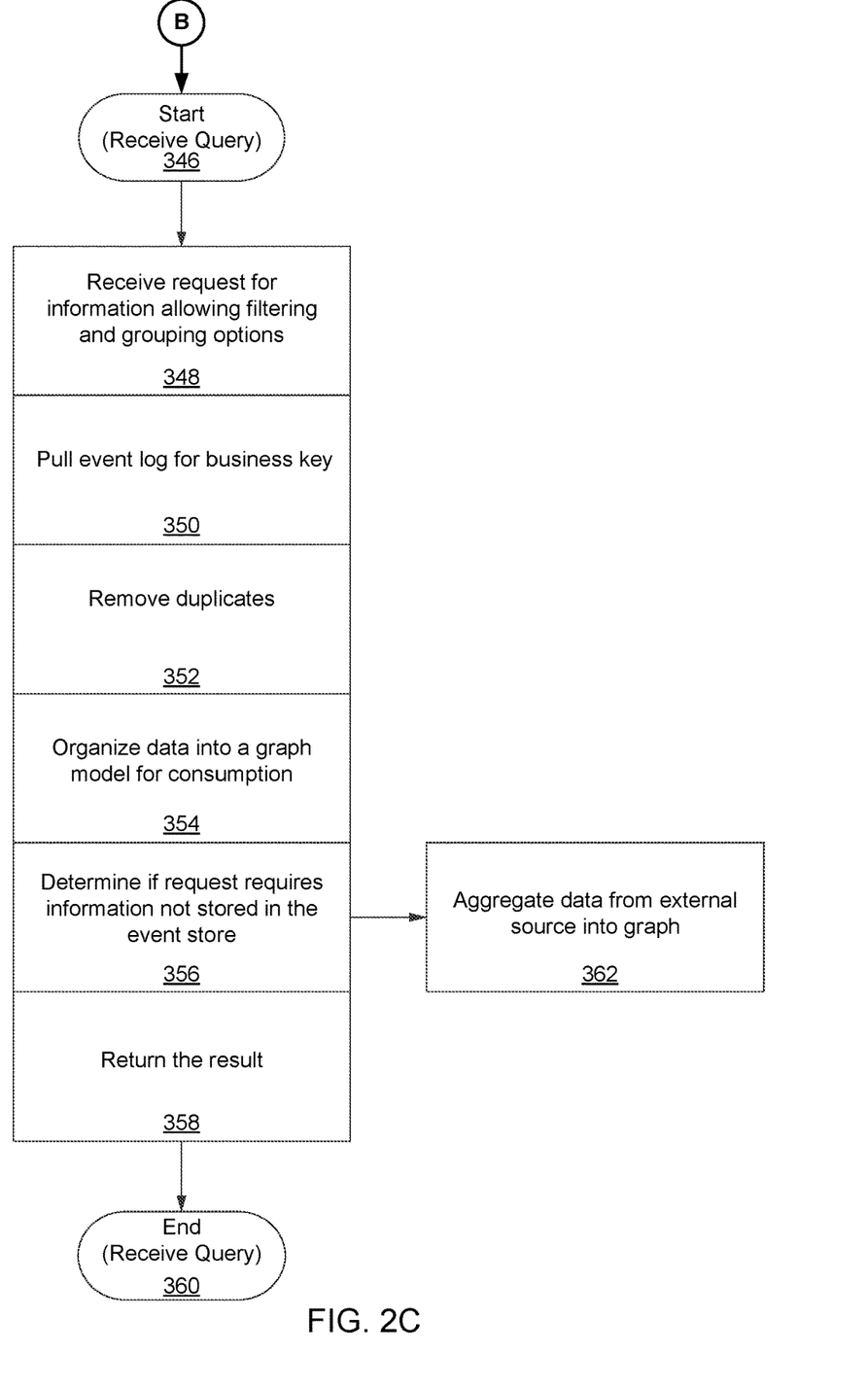

Referring to FIGS. 2A-2C, there is shown a producer and consumer flowchart associated with system 100 in FIG. 1. The system 100 is performing operational workflow transparency, end-to-end events tracking and search-query functionality for a prior-authorization system using disparate event producers 101 and event consumers 136.

Initially, at step 308, an event producer 101 may generate an event. Any client device that can interact with tracker device 102 may be the producer 300 of an event. For example, a delegated vendor (e.g., delegated vendor 114 in FIG. 1) may conduct the medical necessity review for an advance Imaging/Radiology request submitted by a physician. At the receipt of the request, an event may be sent to the tracker 102 and made available via the API (e.g., gateway API 118 in FIG. 1).

The system 100 provides an event producer 101 with the means to deliver that event through various industry-standard protocols (e.g., HTTP) and open-source protocols (e.g., GraphQL). An event producer 101 can be one or more systems participating in the prior-authorization life cycle. Care-management solutions support the review and authorization of cases that require prior authorization. External vendors that specialize in complex authorizations are used to assist with the utilization management for specialized prior-authorization requests such as radiology and diagnostic services. After the authorization decision, a patient can exercise his or her right to appeal if the reason for a prior-authorization denial is in question.

Status tracking is external to a system boundary, enabling transparency across multiple workflows. The workflows can be combined into a larger business capability (e.g., preauthorization and appeals processes can be combined), enabling transparency at different granularities within the system.

At step 310, the event producer 101 may transmit the event with business keys such that tracker 302 can handle the event. For example, the event producer 101 may publish the event making the status available where the tracker device 102 can react and handle the event. Examples of business keys may include System generated IDs such as Auth ID and Appeal ID; Provider industry standard IDs such as NPI and Tax ID; Patient IDs such as HCID (health card identifier) and Medicare ID; and Patient info such as name, date of birth, group ID, member qualifier. In some embodiments, once the event producer 101 (e.g., client device) creates the event and publishes to the load balancer, the delegated vendor 114 accepts a review based on some clinical criteria, and an event is sent to the tracker device 102 and made available via the gateway API 118. The delegated vendor 114 starts the review process, and an event is sent to the tracker device 102 and made available via the API. The delegated vendor pends the review while additional information is gathered, and an event is sent to the tracker and made available via the API. The delegated vendor makes a decision (e.g., denial or approval), and an event is sent to the tracker (e.g., tracker module 102) and made available via the API (e.g., gateway API 118). If denied and an appeal is issued, then the process is repeated but tracked from a different system.

At step 314, each event may be validated by checking that the exact event is not processed twice, identifying the origin context, identifying the temporal order of the events relative to the originating context, understanding the business information carried in the event and/or correlating event instances from multiple event producers (e.g., event producer 101) to be sent to the same data stream. The cloud application server may perform validation, correlation, etc. For example, events collected from the delegated vendor and/or appeal system are correlated within the tracker device 102. Events are enriched to streamline correlation, filtering, ordering, etc.

Producer chain continues to flow A in FIG. 2B.

At step 330 an event is received by tracker device 102. The event representing a status change in the prior-authorization life cycle may be processed. More specifically, events collected from the delegated vendor 114 and/or appeal system are aggregated and processed within the tracker device 102. The tracker device 102 may store the events in an append-only log data structure, such as the append-only log data structure 200 shown in FIG. 3. FIG. 3 illustrates append-only log data structure 200, in accordance with some embodiments. Log data structure 200 may include keys 214-1-214-5, events (e.g., first event 224-1) and search index (e.g., search indexes 252-1-252-2). Each row may correspond to a unique preauthorization event. Each unique preauthorization event may include one or more temporally linked events associated with the respective prior-authorization case. For example, key 214-1 may correspond to a unique preauthorization event that includes temporally linked event 224-1. Search index 252 may be used to search capabilities for the append-only log data structure 200. A search index may include search attributes such as name, account identifier, date of birth, etc. A search index may include links back to the event, pulling the partitions together efficiently and allowing the federated API to calculate the status by reading all events in the data structure. The use of a federated API ensures that the events stay lightweight for faster processing, as only the business keys are stored in the event store.

The log data structure used to communicate is also the persistent mechanism within the tracker device 102. The API accesses the log data structure 2-200, directly ensuring that the user sees the information as soon as the information is received.

In some embodiments, the system described herein eliminates the complexity and inefficiency of using an event store as a data structure for querying, by organizing the data based on business keys and ULIDs to gain efficiency in sorting and partitioning. This enables write, read, and audit concerns to be handled in one data structure, rather than replicating to a separate query model (CQRS). A search index, with links back to the event store, pulls the partitions together efficiently, allowing the federated API to calculate the status by reading all events in the data structure. The use of a federated API ensures that the events stay lightweight for faster processing, as only the business keys are stored in the event store.

At step 332, a unique identifier is generated and assigned to the event. The tracker device 102 generates a universally unique identifier (UUID) for tracking an event. UUIDs produce random distributed IDs, which can cause fragmentation in many data structures. The present system may use the ULID, which is compatible with UUID, URL safe, and lexicographically sortable. Efficiencies are gained in many data structures as the unique identifier alone can be used for sorting and partitioning. The cloud application server may assign the ULID. For example, events collected from the delegated vendor and/or appeal system are assigned a unique identifier within the tracking system. Use of ULID rather than a more traditional unique identifier (UID) enables efficient sorting and partitioning within the system.

At step 334, in conjunction with data being appended to the append-only log structure 200, a search index (referred to herein as search index 252) is built on prior-authorization attributes such as name, health card identifier, etc., with a link back to the log data structure 200 containing the prior authorization. This enables a user to search by name, health card identifier, etc., and get a list of prior authorizations with status history. The cloud application server may persist data into the search index, which resides in the cloud database. For example, events collected from the delegated vendor and/or appeal system are added to the search index, enabling search capabilities within tracking systems API. Building a search index independent of the log data structure with only a pointer to the log enables efficiencies in consuming events.

There is no need to replicate data into a denormalized view for scalability and performance. The search index 252, shown in FIG. 3 and described in more detail below, ensures that the application is performant and the application reconstitutes the events based on views defined within the gateway API 118. Changes to the view can happen without movement of underlying data, resulting in less complexity and quicker turnaround time for code changes.

In some embodiments, additional data structures are created along with the search index 252 to check for duplicates, provide counts, enable metrics, etc. Other solutions use append-only log data structures 200; however, keys are mapped to partitions that can contain more than one prior authorization although the order is guaranteed. The log data structure 200 is then used to stream events into a more permanent storage solution, as the main intent of the log is for asynchronous transmission. Some implementations use the append-only log data structure 200 for streaming in addition to permanent storage, enabled by how the append-only log data structure 200 is organized and indexed.

At step 336, data may be tokenized to de-identify personal health information (PHI) and personal identification information (PII) confidential data according to HIPAA and internal governance requirements. The cloud application server may de-identify data prior to persisting to log data structure in the cloud database. For example, events collected from the delegated vendor and/or appeal system de-identified to remove PHI and PII confidential data. As such, this system is HIPAA-compliant and resilient to data breaches.

At step 338, the event is persisted into an append-only log data structure 200 created to track one prior authorization end-to-end. A business key identifier is used as a correlation key linked to a log data structure ensuring that only the events related to a particular prior authorization are grouped together sequentially. Appending to the log temporally correlates events creating a representation of the prior-authorization workflow. The cloud application server persists data into the cloud database. For example, events collected from the delegated vendor and/or appeal system are persisted into an append-only log data structure 200 and available for the API. Data structure may correlate to a workflow enabling more efficient queries.

At step 344, events are transferred to downstream systems such as the data warehouse, analytics platform, etc. The cloud application server will transfer data to a warehouse (e.g., warehouse 116). For example, events collected from the delegated vendor and/or appeal system are then streamed to additional systems for further analysis and/or long-term storage. The system may be extensible.

Additional data structures are created along with the search index to check for duplicates, provide counts, enable metrics, etc. The cloud application server will persist additional data structures in the cloud database. For example, dashboards and reports are made available of the events collected from the delegated vendor and/or appeal system within the tracking system. As such, the system has the ability to add new capabilities without affecting the core processing.

Consumer chain continues to flow B in FIG. 2C.

A consumer may access the prior-authorization status information via an API gateway (e.g., GraphQL). A gateway (e.g., gateway API 118) merges all API schemas registered into a single schema consumed by the user, enabling drill-down capability on each event for additional information about the event. For example, a customer service representative receives a call inquiring about the status of a prior authorization. The representative pulls up a dashboard that displays the status history from the tracker 102. If additional information is required, then the representative will click on that status to get further details from the source of record via the gateway. This offers a single endpoint for both the producing and consuming of events, and simplifies the integration into the system.

At step 348, the receive request for information allows filtering and grouping options. The API allows users to query, group, and page through statuses and status history selecting only the data necessary to support various channels (e.g., web, mobile, notifications) and screens. The cloud application server may implement the API. For example, the customer service representative can view the information via a web browser, mobile phone, etc. (e.g., mobile/web applications 124), and has the capability to filter, group and sort the status information. The API allows the consumer to query and filter within the request so the response will only be the attributes the consumer is interested in. This enables efficiency as the payload is reduced.

In step 350, the API uses the search index to obtain the unique identifiers, then accesses the append-only log data structure 200 directly and aggregates the events in real time based on the user's query. The tracker device 102 reads data from database 108. For example, the search capabilities for the customer service representative are made available by the search index, which contains a pointer to the log data structure that is retrieved and viewed on the dashboard. Data is efficiently stored and indexed, enabling real-time consumption of data.

In step 352, duplicates and/or other events kept for audit, but not applicable for consumption, are removed from the results during a query. The tracker device 102 filters data not applicable for consumption. For example, as results are pulled from the log data structure 200, only the applicable events are returned to the representative. The view of events can be tailored via the gateway API 118 to meet the consumer's needs. All data is available, but unwanted data can be filtered based on the context set in the gateway API 118.

Figure 4:
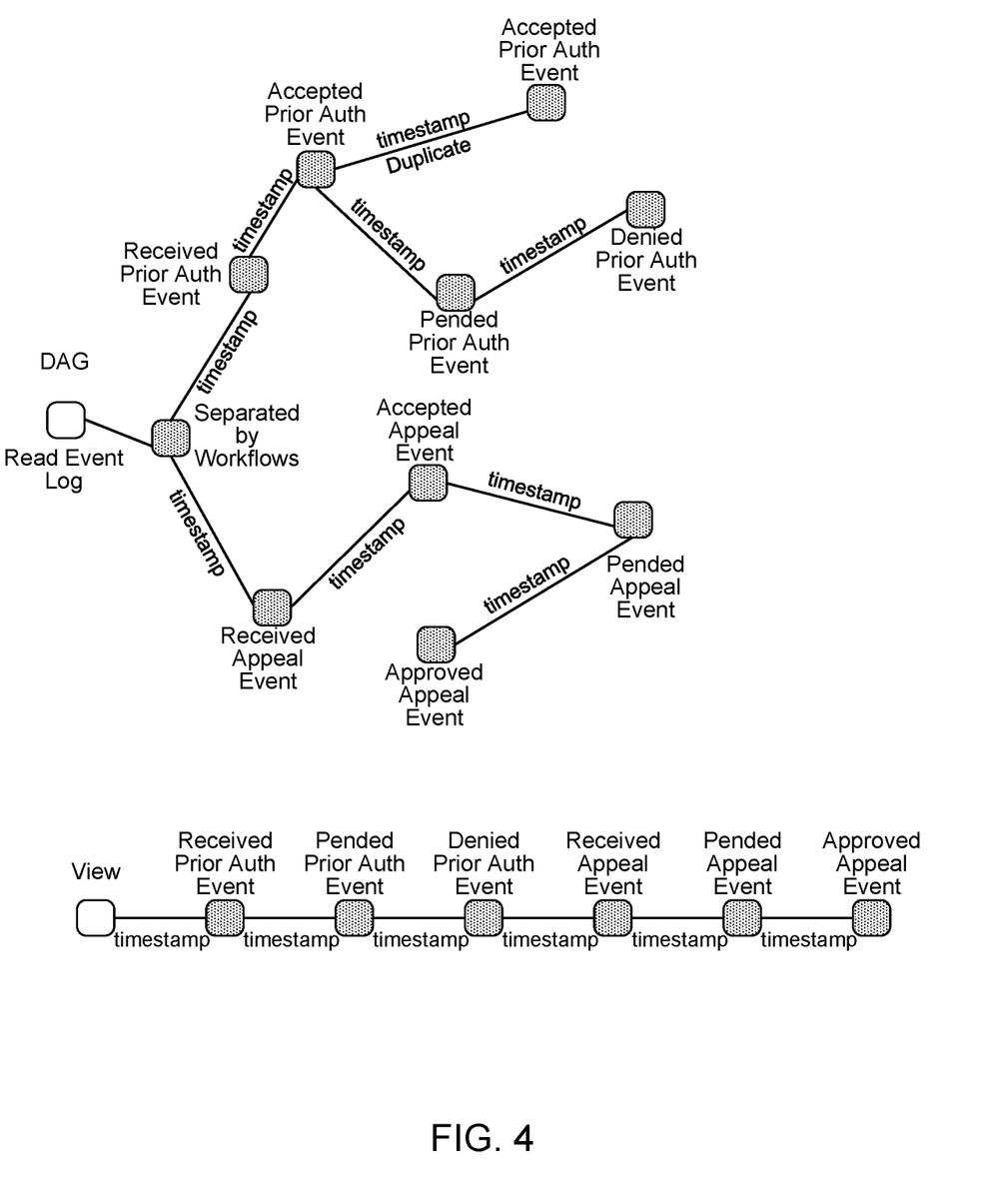
FIG. 4 illustrates an exemplary directed acyclic graph representation, in accordance with some embodiments.

In step 354, an application module (e.g., application instance 120) pulls data from append-only log data structures and constructs a graph of linked data to query and traverse via the API. The cloud application server reads data from the cloud database. For example, the data retrieved from the append-only log data structure is constructed into a directed acyclic graph (DAG) representation that links the order of the events temporally. An example of a DAG representation is shown in FIG. 4.

In step 356, if the query is not able to be answered from the append-only log data structure, then a registered API within the gateway will be used to satisfy the additional data requirement. The cloud application server will access external services. For example, the representative can gather more information about the event by clicking on that event. This may enable the system to be extended to incorporate additional data repositories without impacting current consumers.

In step 362, business keys within the append-only log data structure 200 are used to link to business entities residing in another system registered with the gateway. The additional information is then aggregated along with the append-only log data appearing as if only one system was accessed from the consumer perspective. The tracker device 102 will aggregate data from external services. For example, the gateway API 118 understands where data elements exist and will route the request to one or more systems to satisfy the representations request. From a consumer point of view, the data resides within a single data source, accessible from a single endpoint.

In step 358, data satisfying the consumer's request is returned, and the event consumer 136 will receive a response. For example, only the data elements requested will be returned to the screen, which allows the client application to customize for different users of their application. The process may be repeated once a new receive query is received, as indicated in step 360.

Many modifications and variations of this disclosure can be made without departing from its spirit and scope, as will be apparent to those skilled in the art. The specific implementations described herein are offered by way of example only, and the disclosure is to be limited only by the terms of the appended claims, along with the full scope of equivalents to which such claims are entitled.

In at least one embodiment, there is included one or more computers having one or more processors and memory (e.g., one or more non-volatile storage devices). In some embodiments, memory or a computer-readable storage medium of memory stores programs, modules and data structures, or a subset thereof for a processor to control and run the various systems and methods disclosed herein. In one embodiment, a nontransitory computer-readable storage medium having stored thereon computer-executable instructions, when executed by a processor, performed one or more of the methods disclosed herein.

It will be appreciated by those skilled in the art that changes could be made to the exemplary embodiments shown and described above without departing from the broad inventive concept thereof. It is understood, therefore, that this invention is not limited to the exemplary embodiments shown and described, but it is intended to cover modifications within the spirit and scope of the present invention as defined by the claims. For example, specific features of the exemplary embodiments may or may not be part of the claimed invention; different components, as opposed to those specifically mentioned, may perform at least some of the features described herein; and features of the disclosed embodiments may be combined. As used herein, the terms "about" and "approximately" may refer to + or −10% of the value referenced. For example, "about 9" is understood to encompass 8.2 and 9.9.

It is to be understood that at least some of the figures and descriptions of the invention have been simplified to focus on elements that are relevant for a clear understanding of the invention, while eliminating, for purposes of clarity, other elements that those of ordinary skill in the art will appreciate may also compose a portion of the invention. However, because such elements are well known in the art, and because they do not necessarily facilitate a better understanding of the invention, a description of such elements is not provided herein.

It will be understood that, although the terms "first," "second," etc., are sometimes used herein to describe various elements, these elements should not be limited by these terms. These terms are only used to distinguish one element from another. For example, a first element could be termed a second element, and, similarly, a second element could be termed a first element, without changing the meaning of the description, so long as all occurrences of the "first element" are renamed consistently and all occurrences of the second element are renamed consistently. The first element and the second element are both elements, but they are not the same element.

As used herein, the term "if" may be, optionally, construed to mean "upon" or "in response to determining" or "in response to detecting" or "in accordance with a determination that," depending on the context. Similarly, the phrase "if it is determined" or "if [a stated condition or event] is detected" is, optionally, construed to mean "upon determining" or "in response to determining" or "upon detecting [the stated condition or event]" or "in response to detecting [the stated condition or event]" or "in accordance with a determination that [a stated condition or event] is detected," depending on the context.

The terminology used herein is for the purpose of describing particular implementations only and is not intended to be limiting of the claims. As used in the description of the implementations and the appended claims, the singular forms "a," "an" and "the" are intended to include the plural forms as well, unless the context clearly indicates otherwise. It will also be understood that the term "and/or" as used herein refers to and encompasses any and all possible combinations of one or more of the associated listed items. It will be further understood that the terms "comprises" and/or "comprising," when used in this specification, specify the presence of stated features, integers, operations, elements, and/or components, but do not preclude the presence or addition of one or more other features, integers, operations, elements, components, and/or groups thereof.

As used herein, the term "if" may be construed to mean "when" or "upon" or "in response to determining" or "in accordance with a determination" or "in response to detecting" that a stated condition precedent is true, depending on the context. Similarly, the phrase "if it is determined (that a stated condition precedent is true)" or "if (a stated condition precedent is true)" or "when (a stated condition precedent is true)" may be construed to mean "upon determining" or "in response to determining" or "in accordance with a determination" or "upon detecting" or "in response to detecting" that the stated condition precedent is true, depending on the context.

Further, to the extent that the method does not rely on the particular order of steps set forth herein, the particular order of the steps should not be construed as limitation on the claims. The claims directed to the method of the present invention should not be limited to the performance of their steps in the order written, and one skilled in the art can readily appreciate that the steps may be varied and still remain within the spirit and scope of the present invention.

What is claimed is:

1. A method for operational workflow transparency and end-to-end events tracking, the method comprising:
   at an event producer system:
      generating one or more events and corresponding key business attributes, wherein the one or more events are individual occurrences related to a user workflow, wherein the key business attributes include system generated identifiers, provider industry standard identifiers, patient identifiers, and patient information;
      publishing the event and the key business attributes to a tracking system via one or more internet protocols and application platform interfaces provided by a tracking system;
   at the tracking system:
      receiving one or more events from the event producer system; and
      for each respective event of the one or more events:
         validating the respective event;
         generating a universally unique lexicographically sortable identifier (ULID) for an append-only log data structure for the respective event, wherein each row in the log data structure corresponds to a unique prior-authorization case with a unique business case identified, where each unique prior-authorization case includes one or more temporally linked events associated with the respective prior-authorization case;
         generating a search index to enable search capabilities for the append-only log data structure, wherein the search index includes search attributes including key business attributes, name, account identifier and a data pointer to a corresponding prior-authorization case in the log data structure; and
         temporally appending the respective event into the append-only log data structure for the corresponding prior-authorization case.

2. The method of claim 1, wherein validating the respective event includes identifying originating context of an event, identifying the temporal order of the events relative to the originating context, understanding business information carried in the event and correlating event instances from multiple event producers to be sent to the same data stream.

3. The method of claim 2, wherein validating the event further comprises tokenizing confidential information.

4. The method of claim 3, wherein an API allows users to query, group, and page through statuses and status history of an event, selecting only the data necessary to support various channels.

5. The method of claim 4, wherein the API uses the search index to obtain the unique identifiers, then accesses the append-only log data structure directly and aggregates the events in real time based on a user's query.

6. The method of claim 5, wherein the event producer system updates preauthorization status information, when received or pended, based on information supplied by a utilization-management and appeal system.

7. The method of claim 6, wherein a unique business case identified is used as a correlation key linked to a log data structure ensuring that only the events related to a particular prior authorization are grouped together sequentially.

8. The method of claim 7, wherein appending to the log correlates events creating a representation of a preauthorization workflow.

9. The method of claim 8, wherein an extended workflow event will be appended to a preauthorization end-to-end log when an event is received with the correlation key.

10. The method of claim 9, wherein the event producer system is deployed on-premises, in a public, private, hybrid, or cloud-based system.

11. The method of claim 10, further comprising collecting metrics, counts, and additional groupings for reporting.

12. The method of claim 1, further comprising:
    receiving a request from a client device for tracking an event in the end-to-end event tracking system, wherein the request includes event characteristics and query characteristics for querying requisite data from the event; and
    in response to receiving the request from a user:
        accessing a search index database using the event characteristics, wherein the search index database includes unique pointers to event entries in an append-only log data structure, wherein each event entry includes one or more temporally sequentially linked sub-events;
        obtaining a respective unique data pointer to a respective event entry in the append-only log data structure;
        traversing the append-only log data structure using the respective unique data pointer obtained from the search index database;
        obtaining the temporally sequentially linked sub-events that correspond to the event entry associated with the respective unique data pointer obtained from the search index database;
        removing any temporally sequentially linked sub-events that are duplicates of other temporally sequentially linked sub-events or are not responsive to the request from the user;
        organizing temporally sequentially linked sub-events from the append-only log data structure and constructing a data graph based on the query characteristics;
        traversing the temporally sequentially linked sub-events of the data graph based on the query characteristics to select results data; and
        returning the results data to the client device.

13. A method for receiving a search query in an end-to-end event status tracking system, the method comprising:
    receiving a request from a client device for tracking status in the end-to-end event tracking system, wherein the request includes event characteristics and query characteristics for querying requisite data from the event; and
    in response to receiving the request from a user:
        accessing a search index database using the event characteristics, wherein the search index database includes unique pointers to event entries in an append-only log data structure, wherein each event entry includes one or more temporally sequentially linked sub-events;
        obtaining a respective unique data pointer to a respective event entry in the append-only log data structure;
        traversing the append-only log data structure using the respective unique data pointer obtained from the search index database;
        obtaining the temporally sequentially linked sub-events that correspond to the event entry associated with the respective unique data pointer obtained from the search index database;
        removing any temporally sequentially linked sub-events that are duplicates of other temporally sequentially linked sub-events or are not responsive to the request from the user;
        organizing temporally sequentially linked sub-events from the append-only log data structure and constructing a data graph based on the query characteristics;
        traversing the temporally sequentially linked sub-events of the data graph based on the query characteristics to select results data; and
        returning the results data to the client device.

14. The method of claim 13, wherein the query characteristics include filtering, grouping and sorting options.

15. The method of claim 13, wherein the data graph includes vertices that correspond to sub-events and edges that include timestamps indicated when a respective sub-event occurred.

16. The method of claim 13, wherein the data graph is a directed acyclic graph.

17. The method of claim 13, wherein business keys within the append-only log data structure are used to access third-party databases to obtain additional data.

18. The method of claim 13, further comprising:
    determining whether the results data satisfies the request from the client device, and
    if the results data does not satisfy the request from the client device:
        obtaining business keys from append-only log data structures and obtaining additional data from third-party databases to append to the results data, and
    if the results data does satisfy the request from the client device:
        refraining from obtaining the business keys and provide the results data to the user.

\* \* \* \* \*